United States Patent
Yamano

(10) Patent No.: US 8,319,866 B2
(45) Date of Patent: Nov. 27, 2012

(54) IMAGING OPTICAL SYSTEM AND IMAGING APPARATUS

(75) Inventor: Hiroki Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 280 days.

(21) Appl. No.: 12/801,934

(22) Filed: Jul. 2, 2010

(65) Prior Publication Data

US 2011/0007204 A1 Jan. 13, 2011

(30) Foreign Application Priority Data

Jul. 8, 2009 (JP) ................ P2009-161471

(51) Int. Cl.
| H04N 9/083 | (2006.01) |
| H04N 3/14 | (2006.01) |
| H04N 5/335 | (2006.01) |
| H04N 9/04 | (2006.01) |
| H04N 5/225 | (2006.01) |
| F21V 9/04 | (2006.01) |
| F21V 9/06 | (2006.01) |
| G02B 5/08 | (2006.01) |
| G02B 5/20 | (2006.01) |
| H01J 9/00 | (2006.01) |
| H01J 9/24 | (2006.01) |

(52) U.S. Cl. ........... 348/273; 348/342; 359/359; 445/24
(58) Field of Classification Search ........... 348/362, 348/223.1, 273; 359/359; 445/24
See application file for complete search history.

(56) References Cited

U.S. PATENT DOCUMENTS

| 6,456,345 B1 | 9/2002 | Ise |
| 2002/0012052 A1 | 1/2002 | Nagano |
| 2007/0275624 A1* | 11/2007 | Kawaguchi et al. ............ 445/24 |

FOREIGN PATENT DOCUMENTS

| JP | 07-020529 A | 1/1995 |
| JP | 11-326894 A | 11/1999 |
| JP | 3918500 B2 | 2/2007 |

* cited by examiner

Primary Examiner — Sinh Tran
Assistant Examiner — Christopher K Peterson
(74) Attorney, Agent, or Firm — Rader Fishman & Grauer, PLLC

(57) ABSTRACT

An imaging optical system includes: a light control element formed of a dye pigment-containing dichroic guest-host liquid crystal, and that is disposed on a light path to adjust a quantity of incident light for an image sensing device; and an optical filter disposed on the light path, and that includes an infrared absorbing material, the optical filter having a spectral transmittance that satisfies the following conditions (1), (2), and (3)

$$0.6 < T_{IRCF(580)}/T_{IRCF(540)} < 1.05 \qquad (1)$$

$$0.1 < T_{IRCF(640)}/T_{IRCF(540)} < 0.5 \qquad (2)$$

$$|T_{IRCF(700)}/T_{IRCF(540)}| < 0.05 \qquad (3)$$

where $T_{IRCF(540)}$, $T_{IRCF(580)}$, $T_{IRCF(640)}$ and $T_{IRCF(700)}$ are the spectral transmittance of the optical filter for the light with a wavelength of 540 nm, 580 nm, 640 nm and 700 nm, respectively.

8 Claims, 13 Drawing Sheets

IMAGING OPTICAL SYSTEM AND IMAGING APPARATUS

BACKGROUND OF THE INVENTION

1. Field of the Invention

The present invention relates to the technical field of imaging optical systems and imaging apparatuses, specifically to the technical field in which a light control element that adjusts the quantity of incident light for an image sensing device, and an optical filter that includes an infrared absorbing material are used to ensure a desirable white balance regardless of the density of the light control element, and to realize desirable color reproducibility concerning the red region.

2. Description of the Related Art

There have been recent demands for miniaturization of imaging apparatuses, such as digital video cameras and digital still cameras, with maintained high resolution.

To meet such demands, imaging apparatuses have been proposed that include a miniaturized imaging optical system, and a high-density CCD (Charge Coupled Device) or a high-density CMOS (Complementary Metal-Oxide Semiconductor) installed as an image sensing device.

However, miniaturizing the imaging optical system reduces the aperture area of the aperture stop, and thus produces considerable image deterioration due to a diffraction phenomenon.

In some imaging apparatuses, the light quantity control mechanism that adjusts the quantity of incident light for the image sensing device is realized by, for example, a mechanical iris system that mechanically drives the aperture blades or ND (Neutral Density) filter using an actuator. This type of imaging apparatus using a mechanical iris system requires a large space for disposing the iris system, and cannot be miniaturized to sufficient levels.

As a countermeasure, other type of imaging apparatus adjusts the quantity of incident light for the image sensing device with an electrical iris system, using a light control element of electrochemical material such as liquid crystal or EC (electrochromic) material (see, for example, JP-A-7-20529, JP-A-11-326894, and Japanese Patent No. 3918500).

SUMMARY OF THE INVENTION

Because imaging apparatuses are used under different environmental conditions, imaging apparatuses equipped with the electrical iris system need to be capable of desirable white balance adjustment under temperature conditions of −20° C. to 80° C.

However, such desirable white balance adjustment under temperature conditions of −20° C. to 80° C. is difficult with the imaging apparatuses equipped with the electrical iris system described in JP-A-7-20529 and JP-A-11-326894.

For desirable white balance adjustment, the imaging apparatus described in Japanese Patent No. 3918500 uses a light control element formed of a dye pigment-containing dichroic guest-host liquid crystal to adjust the quantity of incident light for the image sensing device.

Generally, the spectral transmittance characteristic of the light control element of dichroic guest-host liquid crystal is such that the spectral transmittance in the red region in the vicinity of the wavelengths of 600 nm to 700 nm becomes higher than in the region on the shorter wavelength side as the density is increased. Specifically, with increase in the density of the light control element, the spectral transmittance for the light of 600 nm wavelength and higher becomes notably greater than the spectral transmittance on the shorter wavelength side with a wavelength below 600 nm (see FIG. 11).

In FIG. 11, D1, D2, and D3 represent light control elements of different densities, D1 being of the lowest density, and D3 being of the highest density. The values of spectral transmittance are, for example, D1=87.5%, D2=45.4%, and D3=10.0% at a wavelength of 540 nm.

As described above, in the light control element of dichroic guest-host liquid crystal, the spectral transmittance becomes higher in the red region than in the region on the shorter wavelength side. Thus, the light intensity becomes overly high in the red region, and this presents an obstacle to desirable white balance adjustment.

The imaging apparatus described in Japanese Patent No. 3918500 looks at this characteristic of spectral transmittance that becomes higher in the red region than in the region on the shorter wavelength side, and attempts to perform desirable white balance adjustment by setting a cut wavelength on the shorter wavelength side of the red region in the vicinity of 630 nm.

However, because the imaging apparatus described in Japanese Patent No. 3918500 sets a cut wavelength on the shorter wavelength side of the red region in the vicinity of 630 nm, the reproducibility of red color in the output pictures and videos deteriorates particularly in the wavelength range of 600 nm to 700 nm.

FIG. 12 is a graphical representation of the spectral transmission characteristic of the optical filter of related art in which the cut wavelength is set on the shorter wavelength side in the vicinity of the wavelength of 630 nm.

FIG. 13 is a graphical representation of the spectral transmission characteristic when the optical filter of FIG. 12 is used in combination with a light control element of dichroic guest-host liquid crystal under varying densities of the light control element.

As represented in FIG. 13, in the imaging apparatus of related art, the spectral transmittance abruptly decreases toward the longer wavelength side in the red region of 630 nm to 680 nm wavelength, and clear peaks occur in the vicinity of 630 nm in higher densities.

In order to realize desirable white balance adjustment for all the densities of the light control element in the imaging optical system, it is desirable that the values of spectral transmittance at each wavelength vary by the same factor when the density of the light control element is changed.

Specifically, when the spectral transmittances for D1, D2, and D3 are, for example, P1, P2, and P3 at the wavelength of 600 nm, and Q1, Q2, and Q3 at the wavelength of 630 nm, it is desirable that P and Q satisfy the following relations.

$$P1/P2 = Q1/Q2 \quad (d)$$

$$P2/P3 = Q2/Q3 \quad (e)$$

$$P1/P3 = Q1/Q3 \quad (f)$$

The imaging apparatus described in Japanese Patent No. 3918500 does not satisfy these equations (d), (e), and (f).

White balance adjustment is therefore not sufficient in the red region.

Accordingly, there is a need for an imaging optical system and an imaging apparatus that can ensure a desirable white balance under temperature conditions of −20° C. to 80° C. regardless of the density of the light control element, and that can realize desirable color reproducibility concerning the red region.

According to an embodiment of the present invention, there is provided an imaging optical system that includes:

a light control element formed of a dye pigment-containing dichroic guest-host liquid crystal, and that is disposed on a light path to adjust a quantity of incident light for an image sensing device; and an optical filter disposed on the light path, and that includes an infrared absorbing material, the optical filter having a spectral transmittance that satisfies the following conditions (1), (2), and (3)

$$0.6 < T_{IRCF(580)}/T_{IRCF(540)} < 1.05 \quad (1)$$

$$0.1 < T_{IRCF(640)}/T_{IRCF(540)} < 0.5 \quad (2)$$

$$|T_{IRCF(700)}/T_{IRCF(540)}| < 0.05 \quad (3)$$

where $T_{IRCF(540)}$ is the spectral transmittance of the optical filter for the light with a wavelength of 540 nm, $T_{IRCF(580)}$ is the spectral transmittance of the optical filter for the light with a wavelength of 580 nm, $T_{IRCF(640)}$ is the spectral transmittance of the optical filter for the light with a wavelength of 640 nm, and $T_{IRCF(700)}$ is the spectral transmittance of the optical filter for the light with a wavelength of 700 nm.

In the imaging optical system, the light control element adjusts the quantity of incident light for the image sensing device, and the infrared absorbing material of the optical filter absorbs at least some of the infrared rays.

In the imaging optical system, it is preferable that a multilayered film that reflects ultraviolet rays and infrared rays be provided for the optical filter.

By providing a ultraviolet ray- and infrared ray-reflecting multilayered film for the optical filter, the spectral transmission characteristic of the optical filter can be optimized for image processing to the extent not possible with the infrared absorbing material alone.

In the imaging optical system, it is preferable that a multilayered film that reflects ultraviolet rays and infrared rays be provided for non-optical filter optical members disposed on the light path.

By providing a ultraviolet ray- and infrared ray-reflecting multilayered film for non-optical filter optical members disposed on the light path, the spectral transmission characteristic of the optical filter can be optimized for image processing to the extent not possible with the infrared absorbing material alone.

In the imaging optical system, it is preferable that the light control element and the optical filter be disposed adjacent to each other between the image sensing device and a lens disposed closest to a subject on the light path.

By the arrangement in which the light control element and the optical filter are disposed adjacent to each other between the image sensing device and a lens disposed closest to a subject on the light path, the light control element is disposed at such a position that the principal ray and the peripheral ray are brought close to each other.

In the imaging optical system, it is preferable that infrared absorbing glass be used for the optical filter.

With the use of infrared absorbing glass for the optical filter, the optical filter can resist the influence of dimensional changes due to temperature change.

In the imaging optical system, it is preferable that a cyclic olefin resin be used as the base material of the optical filter.

With the use of the cyclic olefin resin as the base material of the optical filter, high stability can be ensured for the optical filter under temperature conditions of −20° C. to 80° C.

In the imaging optical system, it is preferable that the cyclic olefin resin contain an anthocyanin pigment or a cyanine pigment as the infrared absorbing material.

With the anthocyanin pigment or cyanine pigment contained as the infrared absorbing material in the cyclic olefin resin, the properties of the infrared absorbing material can be stabilized under extreme temperature conditions.

According to another embodiment of the present invention, there is provided an imaging apparatus that includes: an image sensing device that converts an optical image into an electrical signal; a light control element formed of a dye pigment-containing dichroic guest-host liquid crystal, and that is disposed on a light path to adjust a quantity of incident light for the image sensing device; and an optical filter disposed on the light path, and that includes an infrared absorbing material, the optical filter having a spectral transmittance that satisfies the following conditions (1), (2), and (3)

$$0.6 < T_{IRCF(580)}/T_{IRCF(540)} < 1.05 \quad (1)$$

$$0.1 < T_{IRCF(640)}/T_{IRCF(540)} < 0.5 \quad (2)$$

$$|T_{IRCF(700)}/T_{IRCF(540)}| < 0.05 \quad (3)$$

where $T_{IRCF(540)}$ is the spectral transmittance of the optical filter for the light with a wavelength of 540 nm, $T_{IRCF(580)}$ is the spectral transmittance of the optical filter for the light with a wavelength of 580 nm, $T_{IRCF(640)}$ is the spectral transmittance of the optical filter for the light with a wavelength of 640 nm, and $T_{IRCF(700)}$ is the spectral transmittance of the optical filter for the light with a wavelength of 700 nm.

With the optical filter containing the infrared absorbing material that satisfies the conditions (1), (2), and (3), a desirable white balance can be ensured, and desirable color reproducibility can be realized concerning the red region.

An imaging optical system according to still another embodiment of the present invention includes: a light control element formed of a dye pigment-containing dichroic guest-host liquid crystal, and that is disposed on a light path to adjust a quantity of incident light for an image sensing device; and an optical filter disposed on the light path, and that includes an infrared absorbing material, the optical filter having a spectral transmittance that satisfies the following conditions (1), (2), and (3)

$$0.6 < T_{IRCF(580)}/T_{IRCF(540)} < 1.05 \quad (1)$$

$$0.1 < T_{IRCF(640)}/T_{IRCF(540)} < 0.5 \quad (2)$$

$$|T_{IRCF(700)}/T_{IRCF(540)}| < 0.05 \quad (3)$$

where $T_{IRCF(540)}$ is the spectral transmittance of the optical filter for the light with a wavelength of 540 nm, $T_{IRCF(580)}$ is the spectral transmittance of the optical filter for the light with a wavelength of 580 nm, $T_{IRCF(640)}$ is the spectral transmittance of the optical filter for the light with a wavelength of 640 nm, and $T_{IRCF(700)}$ is the spectral transmittance of the optical filter for the light with a wavelength of 700 nm.

In this way, a desirable white balance can be ensured, and desirable color reproducibility can be realized concerning the red region.

In the imaging optical system according to the embodiment of the present invention, image quality can be improved by the provision of the ultraviolet ray- and infrared ray-reflecting multilayered film for the optical filter.

In the imaging optical system according to the embodiment of the present invention, image quality can be improved by the provision of the ultraviolet ray- and infrared ray-reflecting multilayered film for non-optical filter optical members disposed on the light path.

In the imaging optical system according to the embodiment of the present invention, deterioration in the resolution of the imaging optical system can be suppressed by the light control element and optical filter disposed adjacent to each other between an image sensing device and a lens disposed closest to a subject on the light path.

In the imaging optical system according to the embodiment of the present invention, the use of infrared absorbing glass for the optical filter ensures desirable surface precision and thus desirable optical performance regardless of temperature changes.

In the imaging optical system according to the embodiment of the present invention, the use of the cyclic olefin resin as the base material of the optical filter ensures high stability and thus a desirable white balance under temperature conditions of −20° C. to 80° C.

In the imaging optical system according to the embodiment of the present invention, the use of the anthocyanin pigment or cyanine pigment contained as the infrared absorbing material in the cyclic olefin resin can stabilize the properties of the infrared absorbing material under extreme temperature conditions.

An imaging apparatus according to yet another embodiment of the present invention includes: an image sensing device that converts an optical image into an electrical signal; a light control element formed of a dye pigment-containing dichroic guest-host liquid crystal, and that is disposed on a light path to adjust a quantity of incident light for the image sensing device; and an optical filter disposed on the light path, and that includes an infrared absorbing material, the optical filter having a spectral transmittance that satisfies the following conditions (1), (2), and (3)

$$0.6 < T_{IRCF(580)}/T_{IRCF(540)} < 1.05 \quad (1)$$

$$0.1 < T_{IRCF(640)}/T_{IRCF(540)} < 0.5 \quad (2)$$

$$|T_{IRCF(700)}/T_{IRCF(540)}| < 0.05 \quad (3)$$

where $T_{IRCF(540)}$ is the spectral transmittance of the optical filter for the light with a wavelength of 540 nm, $T_{IRCF(580)}$ is the spectral transmittance of the optical filter for the light with a wavelength of 580 nm, $T_{IRCF(640)}$ is the spectral transmittance of the optical filter for the light with a wavelength of 640 nm, and $T_{IRCF(700)}$ is the spectral transmittance of the optical filter for the light with a wavelength of 700 nm.

In this way, a desirable white balance can be ensured, and desirable color reproducibility can be realized concerning the red region.

DESCRIPTION OF THE PREFERRED EMBODIMENTS

Embodiments of an imaging optical system and an imaging apparatus of the present invention are described below with reference to the accompanying drawings.

The embodiments described below are based on application of an imaging apparatus of an embodiment of the present invention to a digital still camera, and application of an imaging optical system of an embodiment of the present invention to the imaging optical system of the digital still camera.

It should be noted that the applicable areas of the present invention are not just limited to digital still cameras and the imaging optical system of digital still cameras. For example, the invention is applicable to a wide range of digital video cameras, cameras incorporated in cellular phones, personal computers, and PDAs (Personal digital Assistants), and imaging optical systems provided in a variety of cameras.

[Overall Configuration]

Figure 1:
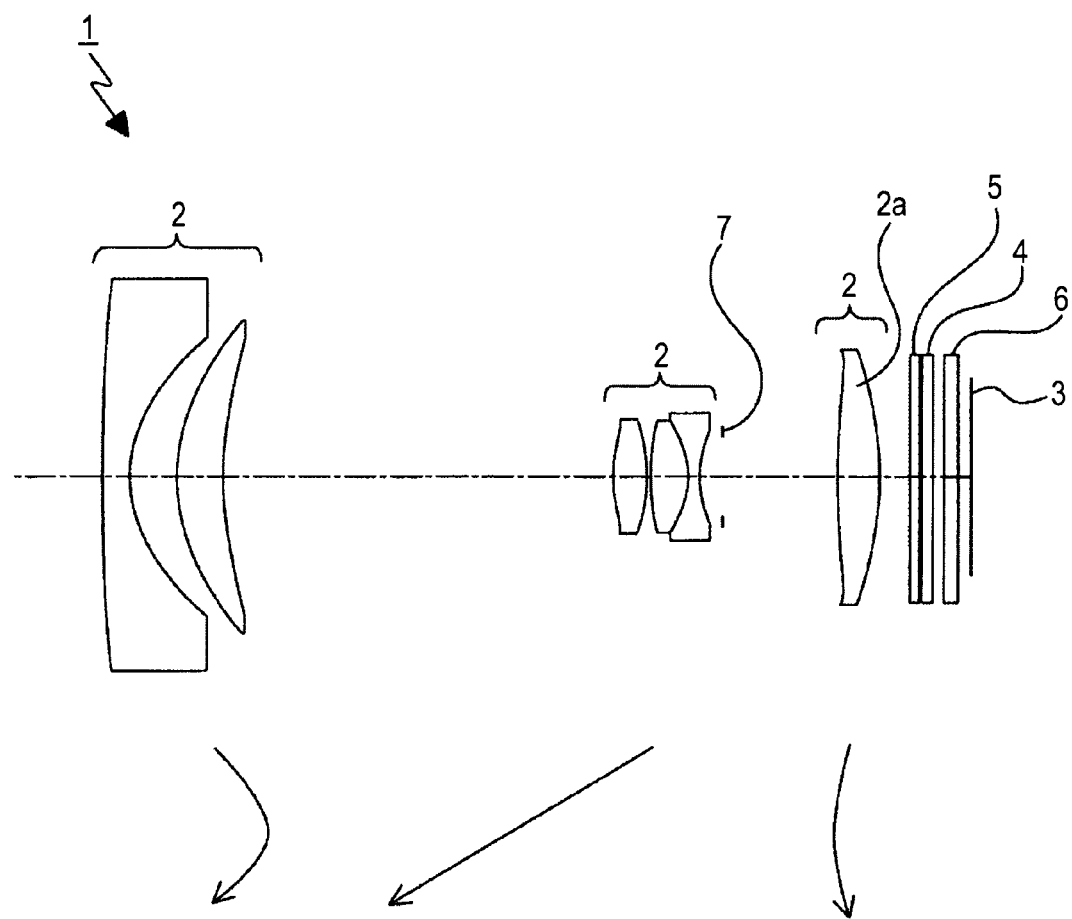
FIG. 1 is a schematic diagram illustrating a configuration of an imaging apparatus according to an embodiment of the present invention, shown in conjunction with FIG. 2 to FIG. 10.

As illustrated in FIG. 1, an imaging apparatus (digital still camera) 1 includes, for example, three lens elements 2, and an image sensing device 3, such as a CCD and a CMOS, disposed on a light path. The imaging apparatus 1 illustrated in FIG. 1 is of a three-element configuration; however, this is merely an example, and the imaging apparatus 1 may include any number of lens elements 2.

A light control element 4 and an optical filter 5 are disposed on the light path, adjacent to each other between the image sensing device 3 and a lens 2a disposed closest to the subject in the lens element 2 closest to the subject. For example, the light control element 4 is disposed on the image side of the optical filter 5.

The light control element 4 may be disposed on the object side of the optical filter 5.

A cover glass 6 is disposed between the light control element 4 and the image sensing device 3. An aperture stop 7 is disposed on the image side of the lens element (second lens element) 2 disposed secondary in the order from the object side to the image side.

[Configuration of Light Control Element]

The light control element 4 is formed of a dichroic guest-host liquid crystal that contains a dye pigment. The light control element 4 of dichroic guest-host liquid crystal is an electrochemical material that undergoes the smallest possible changes in property values in the working temperature of the imaging apparatus 1, for example, under temperature conditions of −20° C. to 80° C.

The light control element 4 is used as an electrical iris system that adjusts the quantity of incident light for the image sensing device 3. The light control element 4 varies its density according to applied voltage, and, with changes in density, varies the spectral transmittance of the light incident on the image sensing device 3.

[Configuration of Optical Filter]

The optical filter 5 is an infrared cut filter that includes an infrared absorbing material. The infrared absorbing material contained in the optical filter 5 satisfies the following conditions (1), (2), and (3).

$$0.6 < T_{IRCF(580)}/T_{IRCF(540)} < 1.05 \quad (1)$$

$$0.1 < T_{IRCF(640)}/T_{IRCF(540)} < 0.5 \quad (2)$$

$$|T_{IRCF(700)}/T_{IRCF(540)}| < 0.05 \quad (3)$$

where $T_{IRCF(540)}$ is the spectral transmittance of the optical filer for the light with a wavelength of 540 nm, $T_{IRCF(580)}$ is the spectral transmittance of the optical filer for the light with a wavelength of 580 nm, $T_{IRCF(640)}$ is the spectral transmittance of the optical filer for the light with a wavelength of 640 nm, and $T_{IRCF(700)}$ is the spectral transmittance of the optical filer for the light with a wavelength of 700 nm.

The conditions (1), (2), and (3) specify the spectral transmission characteristic of the optical filter 5 from the red region to the near-infrared region.

Above and below the range of condition (1), the light quantity near the wavelength 580 nm becomes overly unbalanced with respect to the light quantity in the other visible light region, making it difficult to adjust the white balance in red color reproduction. Further, there will be a substantial incidence of chromic noise because of the excess electrical signal gain involved in image processing, leading to image quality deterioration.

Above the range of condition (2), the light quantity near the wavelength 640 nm becomes too large, and the light intensity becomes overly high in the red region when the density of the light control element 5 is increased. This makes desirable white balance adjustment difficult.

On the other hand, below the range of condition (2), the light intensity becomes too low in the red region, leading to deterioration of image quality in red color reproduction.

Above the range of condition (3), the light quantity near the wavelength 700 nm becomes too large, and the quantity of incident light on the image sensing device 3 becomes excessively large in the near-infrared region. This is detrimental to the reproducibility of red color in the output pictures and videos.

Thus, with the optical filter 5 including the infrared absorbing material that satisfies the foregoing conditions (1), (2), and (3), a desirable white balance can be ensured, and desirable color reproducibility can be realized concerning the red region.

Further, with the infrared absorbing material, the optical filter 5 is able to reduce the ghost generated in the imaging optical system, particularly the red color reflection ghost, making it possible to improve image quality with the reduced ghost.

Preferably, a multilayered film that reflects ultraviolet rays and infrared rays is formed on at least one side of the optical filter 5.

With the optical filter 5 provided with a multilayered film that reflects ultraviolet rays and infrared rays, the spectral transmission characteristic of the optical filter 5 can be optimized for image processing to the extent not possible with the infrared absorbing material alone, making it possible to improve image quality.

The position of the multilayered film that reflects ultraviolet rays and infrared rays is not limited to one side of the optical filter 5, and, for example, the multilayered film may be formed on the both sides of the optical filter 5.

Further, the multilayered film that reflects ultraviolet rays and infrared rays may be provided for optical members or some other component other than the optical filter 5. For example, when another optical filter such as a low-pass filter is disposed in the imaging apparatus 1, the multilayered film may be provided for the low-pass filter, or various other optical members, including the light control element 4 and the cover glass 6, disposed on the light path.

Image quality can also be improved when the multilayered film that reflects ultraviolet rays and infrared rays is provided for optical members or some other component other than the optical filter 5.

As described above, in the imaging apparatus 1, the light control element 4 and the optical filter 5 are disposed adjacent to each other between the image sensing device 3 and the lens 2a disposed closest to the subject on the light path.

By disposing the light control element 4 and the optical filter 5 adjacent to each other between the lens 2a and the image sensing device 3, deterioration in the resolution of the imaging optical system can be suppressed, and the amount of back focus deviation that may occur in manufacture or in response to temperature changes can be reduced, compared with the arrangement in which the light control element 4 is disposed in the vicinity of the aperture stop 7 such that the principal ray and the peripheral ray are distant apart.

Further, when the imaging optical system of the imaging apparatus 1 is a zoom lens optical system in which at least one of the lens elements 2 is moved along the optical axis, the light control element 4 and the optical filter 5 can be provided as non-movable members when disposed adjacent to each other between the image sensing device 3 and the lens 2a disposed closest to the subject on the light path. Thus, by disposing the light control element 4 and the optical filter 5 between the lens 2a and the image sensing device 3, the mechanism of the imaging apparatus 1 can be simplified. Further, because the light control element 4 and the optical filter 5 do not occupy the moving path of the lens elements 2 or the space between the lens elements 2, the imaging apparatus 1 can be reduced in size and increased in zoom range.

Generally, an imaging apparatus including an image sensing device is designed like a subject-side telecentric system, in order to make the field illuminance of the zoom lens optical system uniform. Designed like a subject-side telecentric system, the size of the imaging optical system (zoom lens optical system) can be reduced by the optical design that allows a space to be formed relatively easily between the image sensing device and the lens disposed closest to the subject in the imaging optical system.

Such a space can be used to dispose the light control element 4 and the optical filter 5 adjacent to each other between the image sensing device 3 and the lens 2a disposed closest to the subject on the light path as in the imaging apparatus 1, making it possible to readily reduce the size of the imaging apparatus 1.

The optical filter 5 can be formed using, for example, infrared absorbing glass. With the optical filter 5 formed of infrared absorbing glass, because the glass material resists the influence of dimensional changes due to temperature change, desirable surface precision can be maintained regardless of temperature changes, and desirable optical performance can be maintained regardless of temperature changes. Further, by using infrared absorbing glass, the strength of the optical filter 5 can be improved.

The optical filter 5 may be formed using a resin material, for example, a cyclic olefin resin, as the base material.

The cyclic olefin resin is a material with a number of advantages, including excellent optical properties (high transmissivity, low birefringence, high Abbe number, etc.), high heat resistance, and low water absorbability. Thus, by using the cyclic olefin resin as the base material of the optical filter 5, high stability can be obtained under temperature conditions of −20° C. to 80° C., and a desirable white balance can be ensured.

Further, because the resin materials are less expensive than glass materials, the use of the resin material as the base material of the optical filter 5 can reduce the manufacturing cost of the imaging apparatus 1.

Further, because the cyclic olefin resin has excellent moldability, the optical filter 5 can be formed with a thickness of, for example, 0.3 mm or less. Thus, with the use of the cyclic olefin resin as the base material of the optical filter 5, the size and thickness of the imaging apparatus 1 can be reduced.

When using the cyclic olefin resin as the base material of the optical filter 5, it is preferable to mix the resin with a colorant having optical absorption properties in the near-infrared region, for example, such as an anthocyanin pigment and a cyanine pigment, as the infrared absorbing material.

For example, there are many reports concerning improvements of heat resistance and light resistance in regard to anthocyanin pigments (see, for example, JP-A-2003-292810). Further, because anthocyanin pigments are natural colorants and are expected to have stable reliability even under extreme temperature conditions, anthocyanin pigments, unlike synthetic colorants, can easily overcome environmental concerns.

The imaging apparatus 1 has been described as including, for example, three lens elements 2. However, the light control element 4 and the optical filter 5 may be provided in, for example, an imaging apparatus 1A or an imaging apparatus 1B, as described below (see FIG. 2 and FIG. 3).

Figure 2:
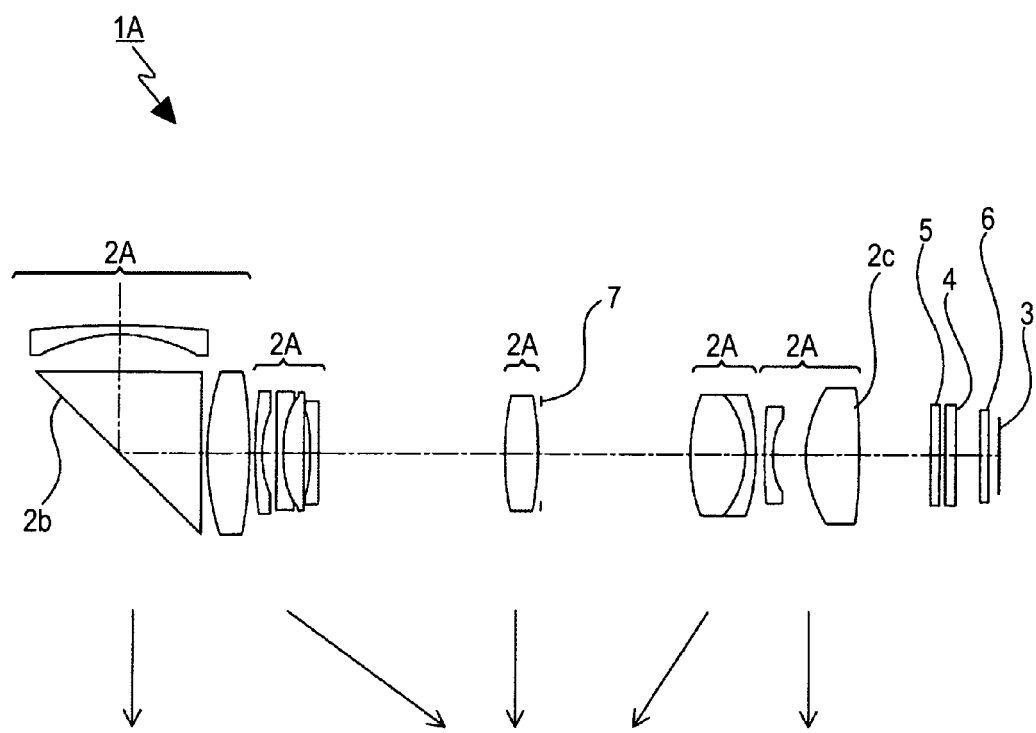
FIG. 2 is a schematic diagram illustrating another configuration of the imaging apparatus.

As illustrated in FIG. 2, the imaging apparatus 1A includes, for example, five lens elements 2A, and an image sensing device 3, such as a CCD and a CMOS, disposed on the light path. The lens element 2A disposed closest to the subject includes a prism 2b that bends the light path at right angle.

The light control element 4 and the optical filter 5 are disposed on the light path, adjacent to each other between the image sensing device 3 and a lens 2c disposed closest to the subject in the lens element 2A closest to the subject. The light control element 4 is disposed, for example, on the image side of the optical filter 5.

The light control element 4 maybe disposed on the object side of the optical filter 5.

A cover glass 6 is disposed between the light control element 4 and the image sensing device 3. An aperture stop 7 is disposed on the image side of the lens element (third lens element) 2A disposed thirdly in the order from the object side to the image side.

The imaging apparatus 1A including the prism 2b can be reduced in thickness, because the prism 2b bends the light path at right angle.

Figure 3:
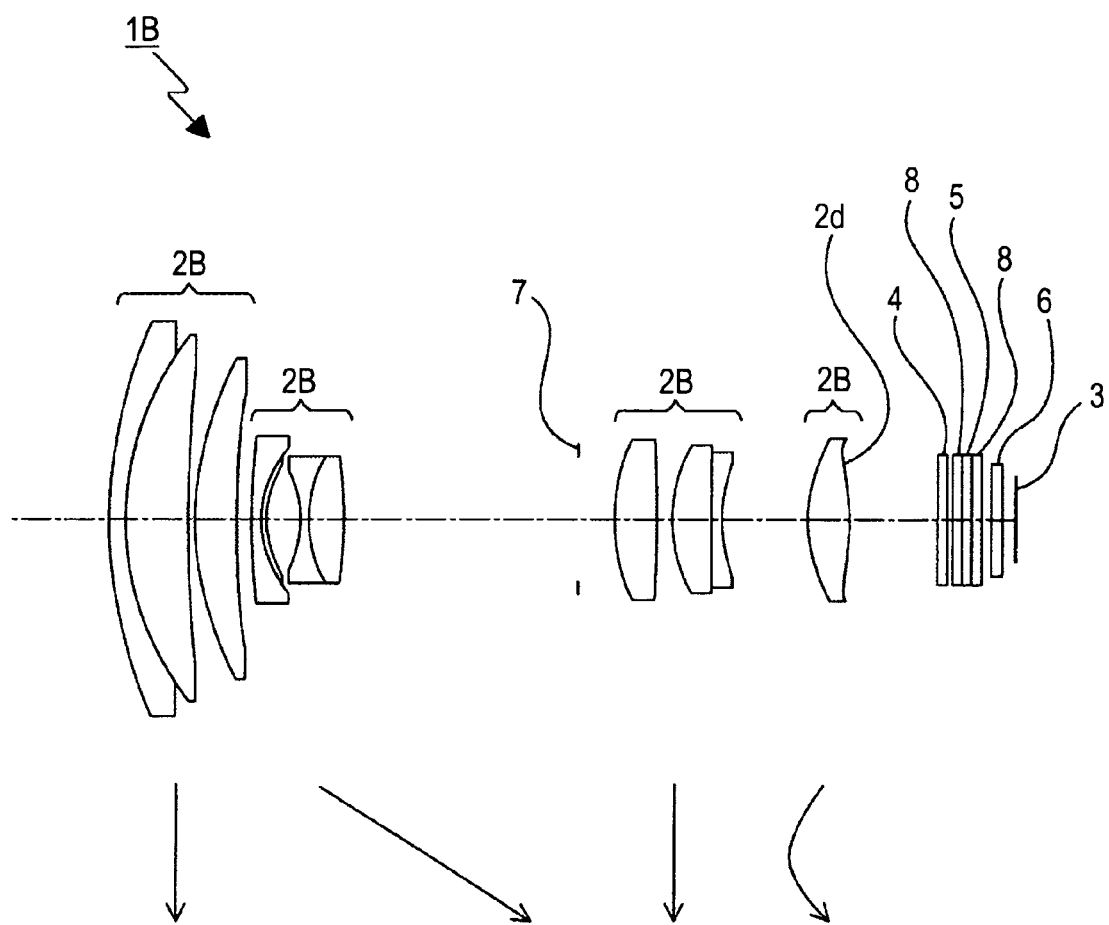
FIG. 3 is schematic diagram illustrating yet another configuration of the imaging apparatus.

As illustrated in FIG. 3, the imaging apparatus 1B includes, for example, four lens elements 2B, and an image sensing device 3, such as a CCD and a CMOS, disposed on the light path.

The light control element 4 and the optical filter 5 are disposed on the light path, adjacent to each other between the image sensing device 3 and a lens 2d disposed closest to the subject in the lens element 2B closest to the subject. The light control element 4 is disposed, for example, on the object side of the optical filter 5.

The light control element 4 may be disposed on the image side of the optical filter 5.

A cover glass 6 is disposed between the light control element 4 and the image sensing device 3. An aperture stop 7 is disposed on the object side of the lens element (third lens element) 2B disposed thirdly in the order from the object side to the image side.

Low-pass filters 8 are provided on the both surfaces of the optical filter 5 relative to the optical axis direction.

In the imaging apparatus 1B provided with the low-pass filters 8, the low-pass filters 8 can prevent the production of moire fringes.

EXAMPLES

Figure 9:
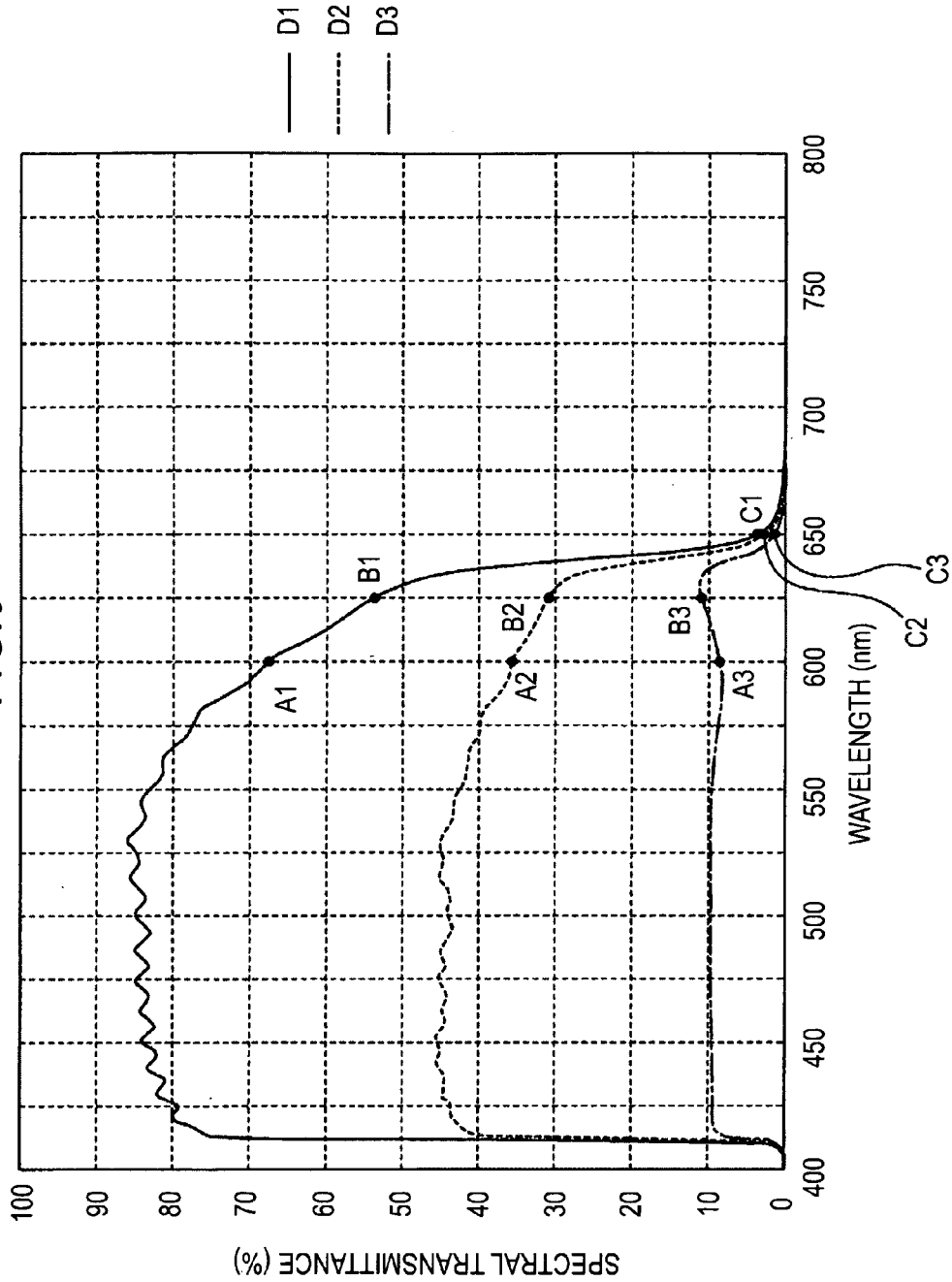
FIG. 9 is a graphical representation of the spectral transmission characteristic of the optical filter used in combination with a light control element under varying densities of the light control element.

Specific examples of the light control element 4 and the optical filter 5 are described below with reference to FIG. 4 to. FIG. 9.

Figure 4:
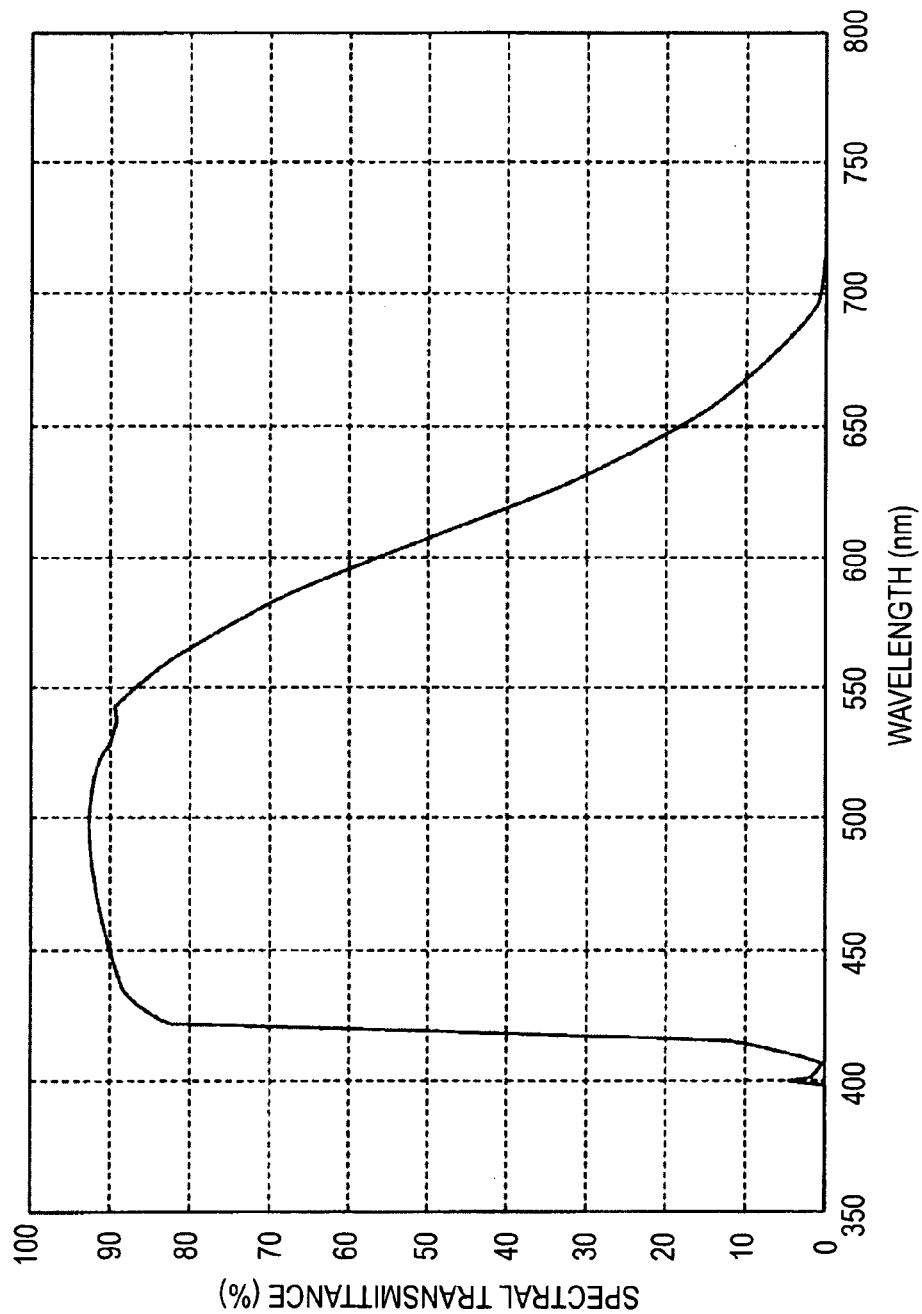
FIG. 4 is a graphical representation of the spectral transmission characteristic of an optical filter according to First Example, shown in conjunction with FIG. 5.
Figure 5:
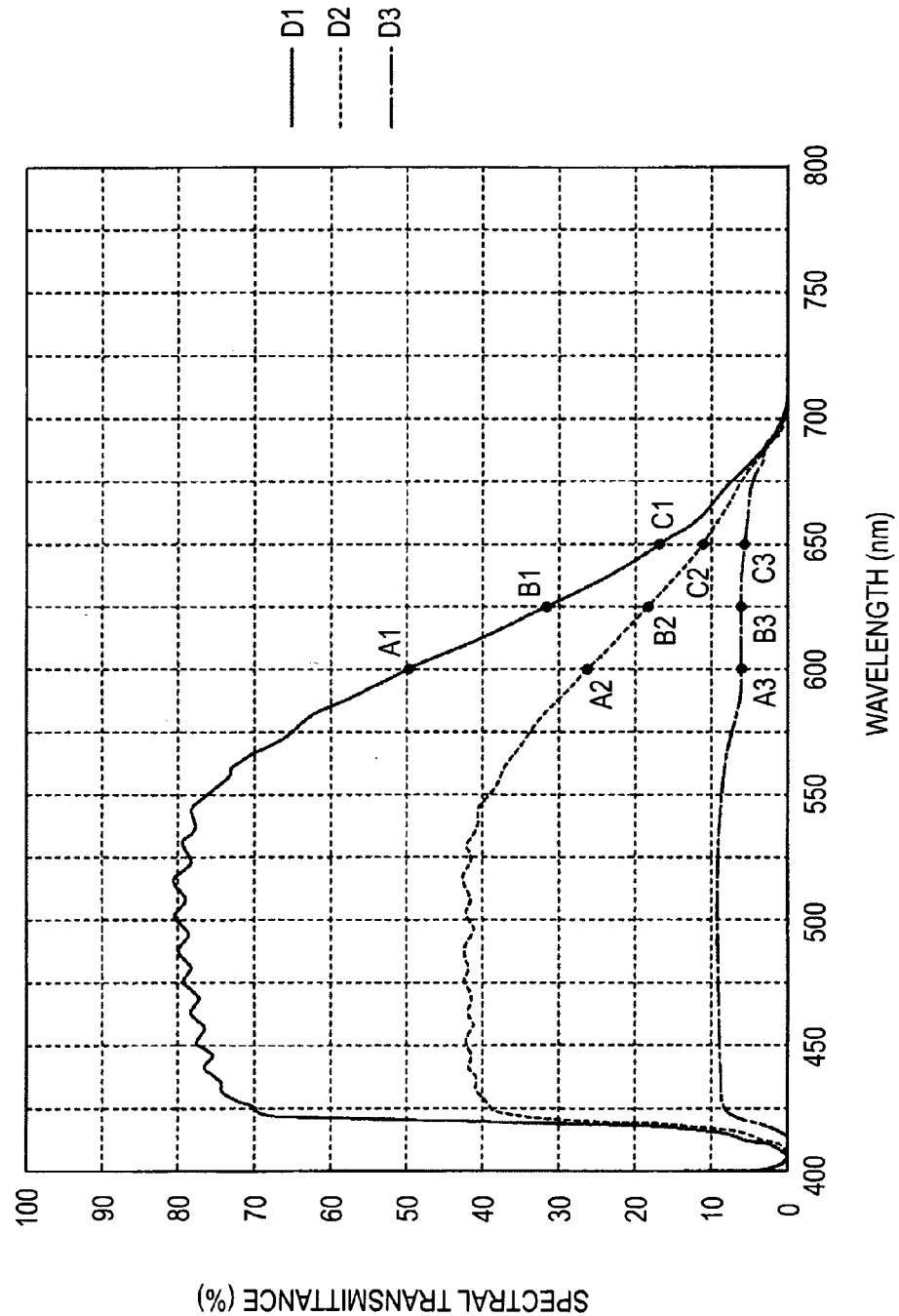
FIG. 5 is a graphical representation of the spectral transmission characteristic of the optical filter used in combination with a light control element under varying densities of the light control element.

FIG. 4 and FIG. 5 are graphical representations according to First Example, in which FIG. 4 represents the spectral transmission characteristic of the optical filter 5, and FIG. 5 represents the spectral transmission characteristic of the optical filter 5 used in combination with the light control element 4 under varying densities of the light control element 4.

In FIGS. 5, D1, D2, and D3 represent light control elements of different densities, D1 being of the lowest density, and D3 being of the highest density.

In First Example, $T_{IRCF(580)}/T_{IRCF(540)}=0.798$, $T_{IRCF(640)}/T_{IRCF(540)}=0.265$, and $|T_{IRCF(700)}/T_{IRCF(540)}|=0.010$, satisfying the conditions (1), (2), and (3).

As represented in FIG. 4 and FIG. 5, the spectral transmittance gradually decreases toward the longer wavelength side in the red region (wavelengths of 600 nm to 700 nm).

In the imaging optical system, it is preferable that the values of spectral transmittance at each wavelength vary by the same factor when the density of the light control element 4 is changed, in order to realize desirable white balance adjustment for all the densities of the light control element 4.

As represented in FIG. 5, the spectral transmittances for D1, D2, and D3 are, for example, A1, A2, A3 at the wavelength of 600 nm, B1, B2, and B3 at the wavelength of 625 nm, and C1, C2, and C3 at the wavelength of 650 nm.

Here, consider that A, B, and C are related to each other as follows.

$$A1/A2 = B1/B2 = C1/C2 \quad (a)$$

$$A2/A3 = B2/B3 = C2/C3 \quad (b)$$

$$A1/A3 = B1/B3 = C1/C3 \quad (c)$$

In First Example, all of these equations (a), (b), and (c) are substantially satisfied, meaning that the values of spectral transmittance at each wavelength in the red region vary by substantially the same factor when the density of the light control element 4 is changed.

In First Example, the conditions (1), (2), and (3) are satisfied, and no cut wavelength is set on the shorter wavelength side of the red region.

This, in First Example, a desirable white balance can be ensured regardless of the density of the light control element 4, and desirable color reproducibility can be realized concerning the red region.

Figure 6:
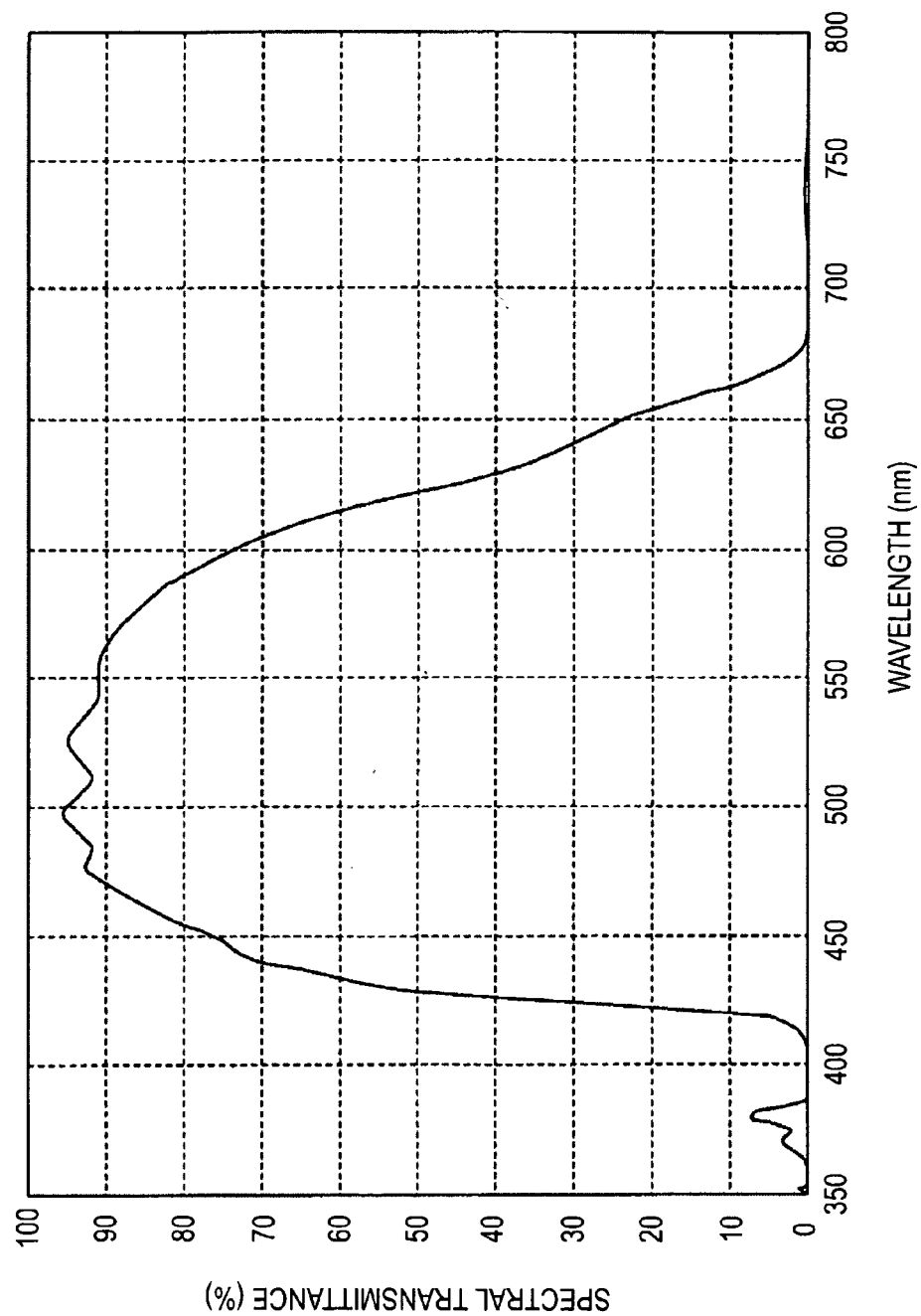
FIG. 6 is a graphical representation of the spectral transmission characteristic of an optical filter according to Second Example, shown in conjunction with FIG. 7.
Figure 7:
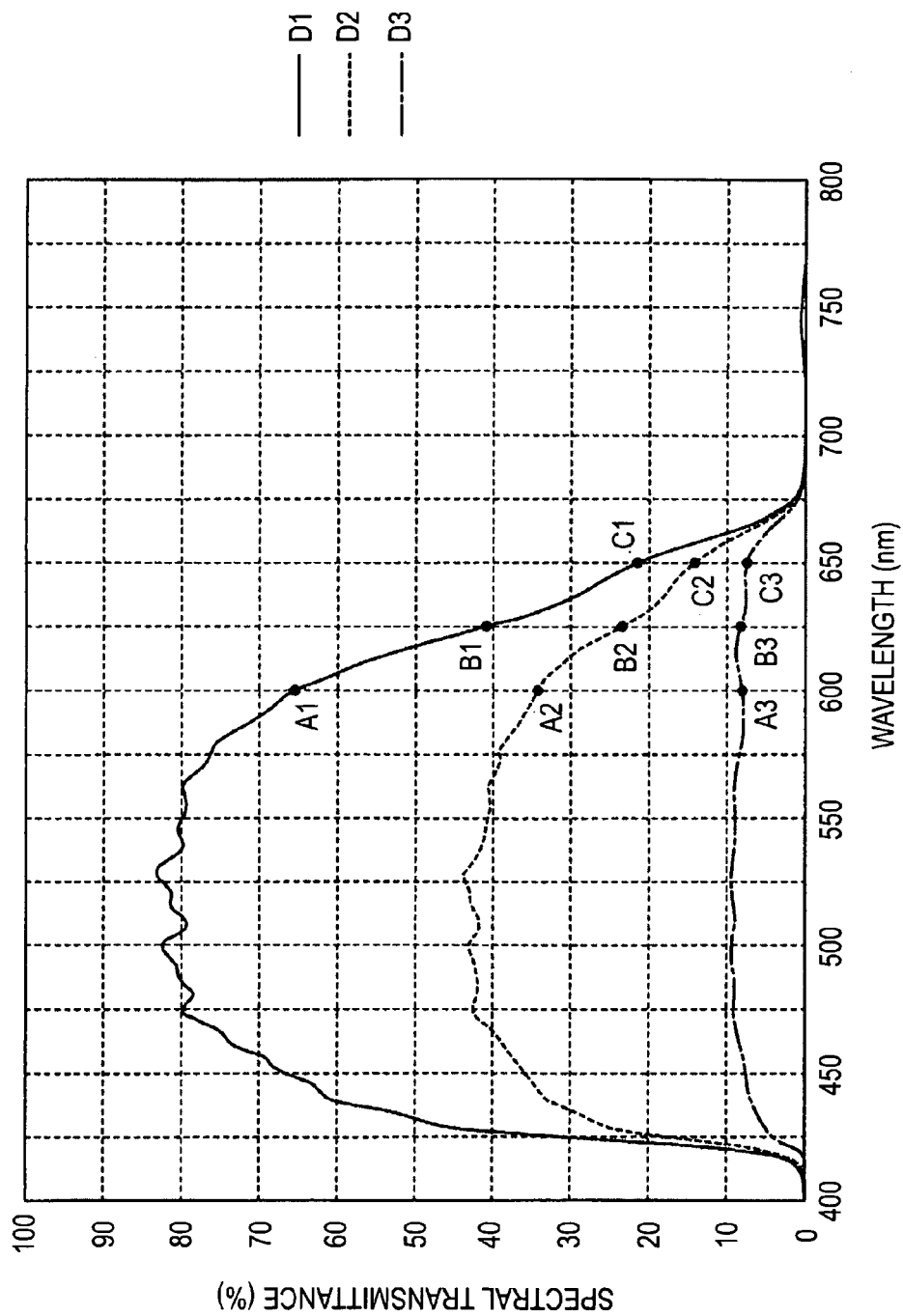
FIG. 7 is a graphical representation of the spectral transmission characteristic of the optical filter used in combination with a light control element under varying densities of the light control element.

FIG. 6 and FIG. 7 are graphical representations according to Second Example, in which FIG. 6 represents the spectral transmission characteristic of the optical filter 5, and FIG. 7 represents the spectral transmission characteristic of the optical filter 5 used in combination with the light control element 4 under varying densities of the light control element 4.

In FIG. 7, D1, D2, and D3 represent light control elements of different densities, D1 being of the lowest density, and D3 being of the highest density.

In Second Example, $T_{IRCF(580)}/T_{IRCF(540)}=0.927$, $T_{IRCF(640)}/T_{IRCF(540)}=0.337$, and $|T_{IRCF(700)}/T_{IRCF(540)}|=0.000$, satisfying the conditions (1), (2), and (3).

As represented in FIG. 6 and FIG. 7, the spectral transmittance gradually decreases toward the longer wavelength side in the red region (wavelengths of 600 nm to 700 nm).

As represented in FIG. 7, the spectral transmittances for D1, D2, and D3 are, for example, A1, A2, A3 at the wavelength of 600 nm, B1, B2, and B3 at the wavelength of 625 nm, and C1, C2, and C3 at the wavelength of 650 nm.

Here, consider that A, B, and C are related to each other as follows.

$$A1/A2 = B1/B2 = C1/C2 \quad (a)$$

$$A2/A3 = B2/B3 = C2/C3 \quad (b)$$

$$A1/A3 = B1/B3 = C1/C3 \quad (c)$$

In Second Example, all of these equations (a), (b), and (c) are substantially satisfied, meaning that the values of spectral transmittance at each wavelength in the red region vary by substantially the same factor when the density of the light control element 4 is changed.

In Second Example, the conditions (1), (2), and (3) are satisfied, and no cut wavelength is set on the shorter wavelength side of the red region.

This, in Second Example, a desirable white balance can be ensured regardless of the density of the light control element 4, and desirable color reproducibility can be realized concerning the red region.

Figure 8:
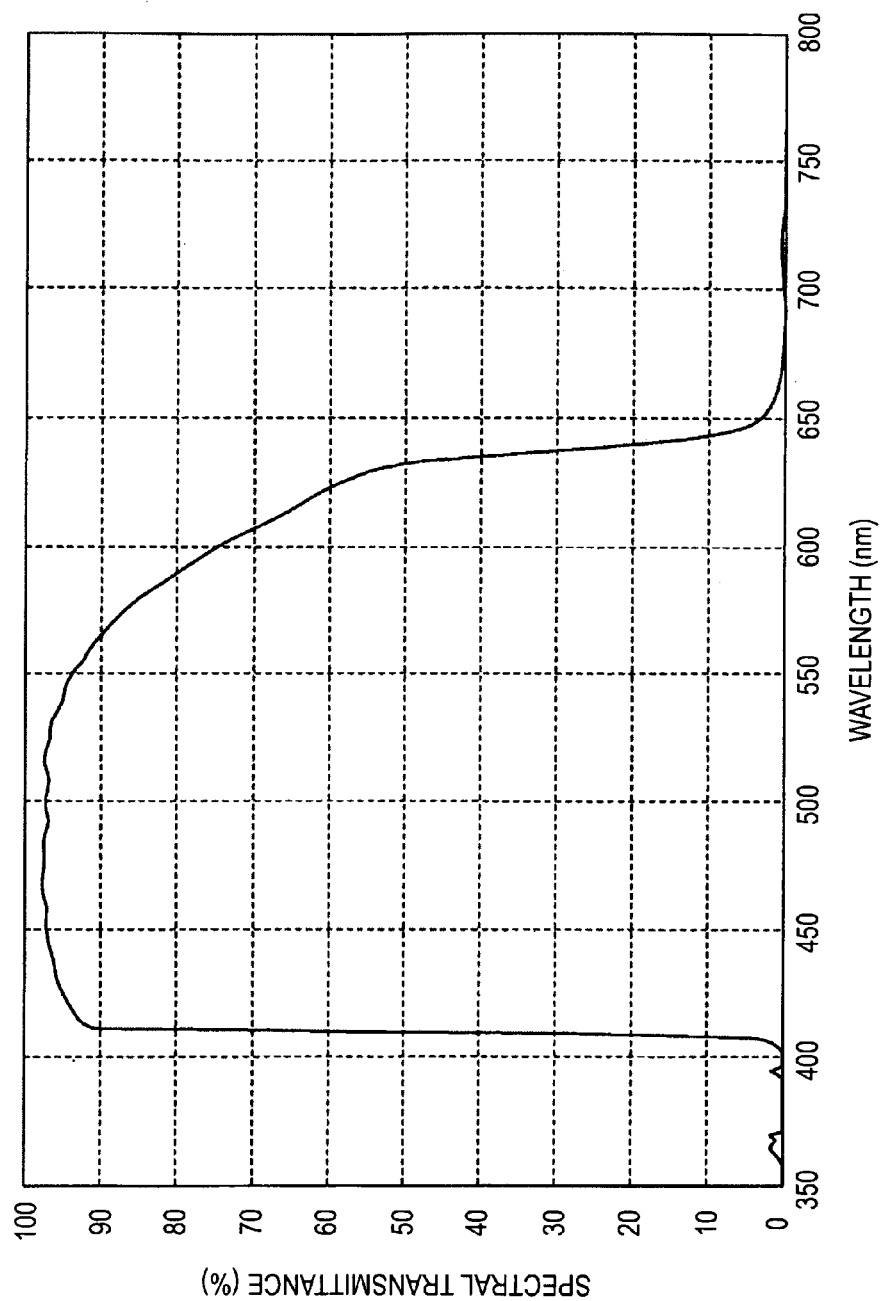
FIG. 8 is a graphical representation of the spectral transmission characteristic of an optical filter according to Third Example, shown in conjunction with FIG. 9.

FIG. 8 and FIG. 9 are graphical representations according to Third Example, in which FIG. 8 represents the spectral transmission characteristic of the optical filter 5, and FIG. 9 represents the spectral transmission characteristic of the optical filter 5 used in combination with the light control element 4 under varying densities of the light control element 4.

In FIGS. 9, D1, D2, and D3 represent light control elements of different densities, D1 being of the lowest density, and D3 being of the highest density.

In Third Example, $T_{IRCF(580)}/T_{IRCF(540)}=0.927$, $T_{IRCF(640)}/T_{IRCF(540)}=0.337$, and $|T_{IRCF(700)}/T_{IRCF(540)}|=0.000$, satisfying the conditions (1), (2), and (3).

As represented in FIG. 8 and FIG. 9, the spectral transmittance gradually decreases toward the longer wavelength side in the red region (wavelengths of 600 nm to 700 nm).

As represented in FIG. 9, the spectral transmittances for D1, D2, and D3 are, for example, A1, A2, A3 at the wavelength of 600 nm, B1, B2, and B3 at the wavelength of 625 nm, and C2, and C3 at the wavelength of 650 nm.

Here, consider that A, B, and C are related to each other as follows.

$$A1/A2 = B1/B2 = C1/C2 \quad (a)$$

$$A2/A3 = B2/B3 = C2/C3 \quad (b)$$

$$A1/A3 = B1/B3 = C1/C3 \quad (c)$$

In Third Example, all of these equations (a), (b), and (c) are substantially satisfied, meaning that the values of spectral transmittance at each wavelength in the red region vary by substantially the same factor when the density of the light control element 4 is changed.

In Third Example, the conditions (1), (2), and (3) are satisfied, and no cut wavelength is set on the shorter wavelength side of the red region.

This, in Third Example, a desirable white balance can be ensured regardless of the density of the light control element 4, and desirable color reproducibility can be realized concerning the red region.

[Embodiment of Imaging Apparatus]

Figure 10:
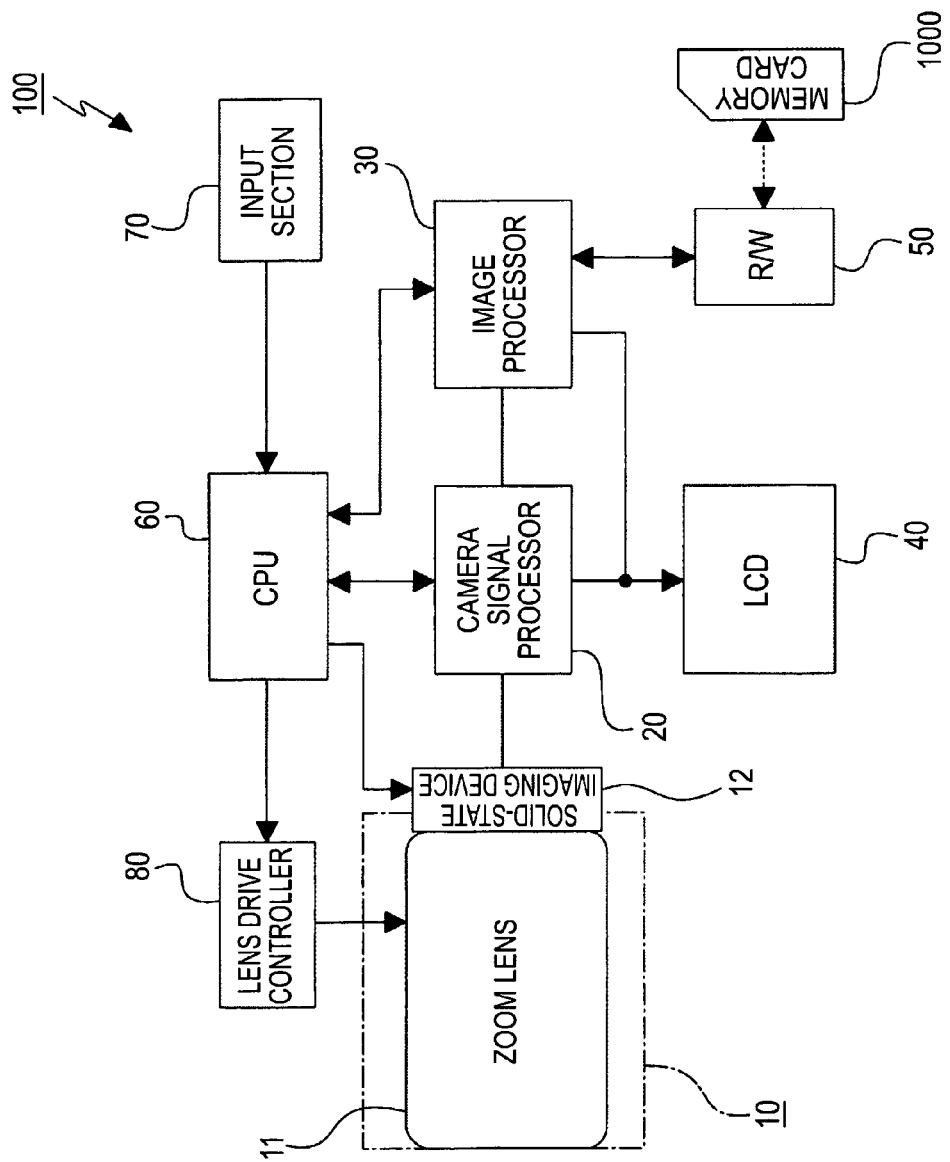
FIG. 10 is a block diagram illustrating an imaging apparatus of an embodiment of the present invention.
Figure 11:
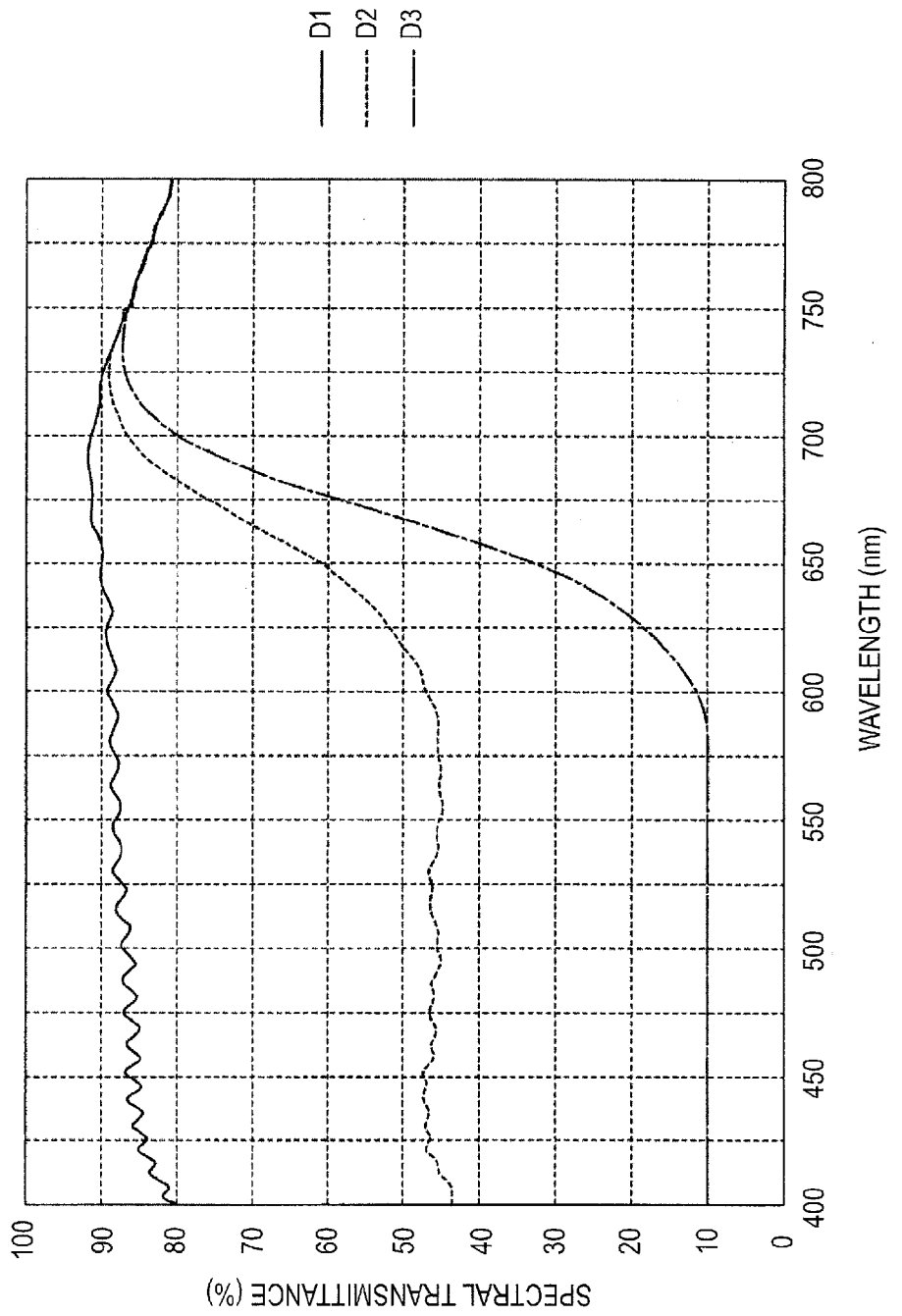
FIG. 11 is a graphical representation of an example of the spectral transmission characteristic of a light control element formed of a dichroic guest-host liquid crystal.
Figure 12:
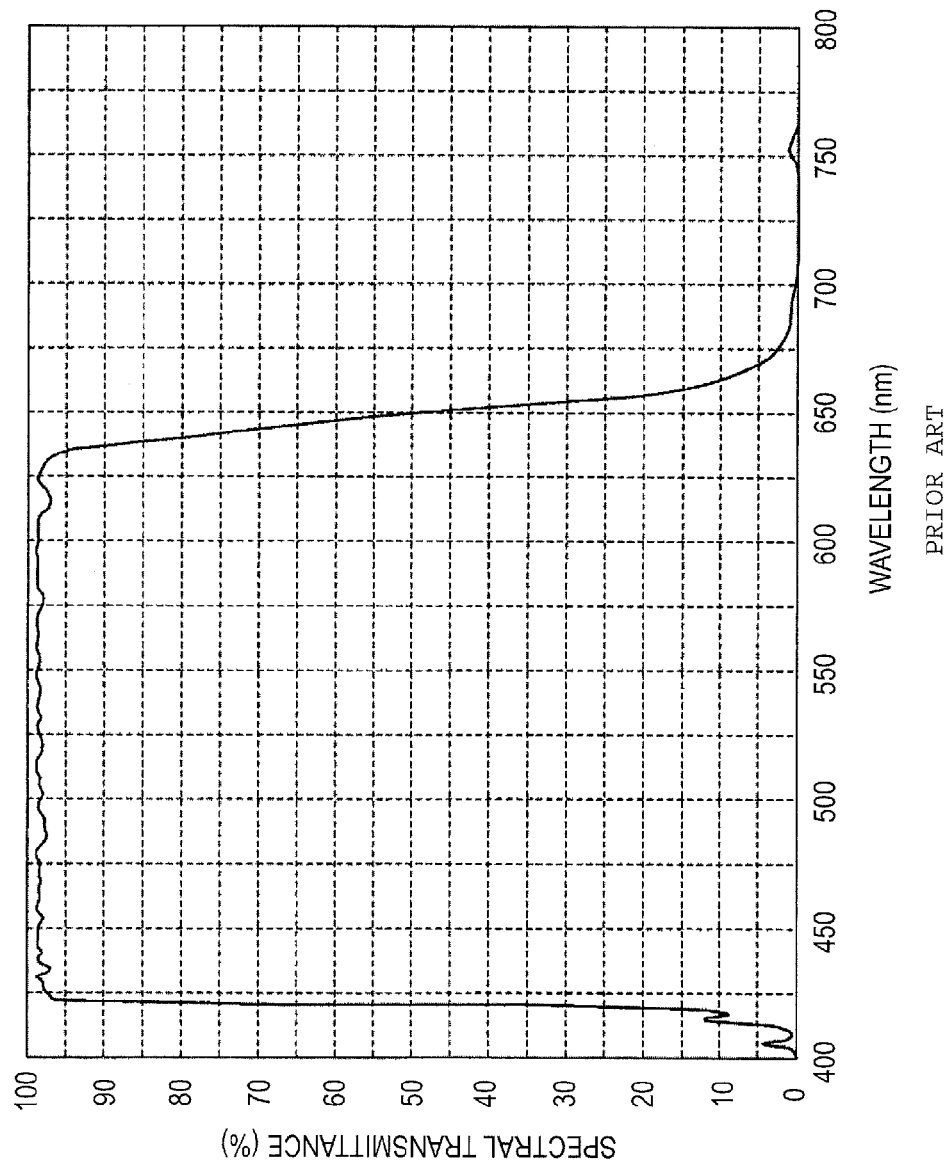
FIG. 12 is a graphical representation of the spectral transmission characteristic of an optical filter of related art in which a cut wavelength is set on the shorter wavelength side of the red region.
Figure 13:
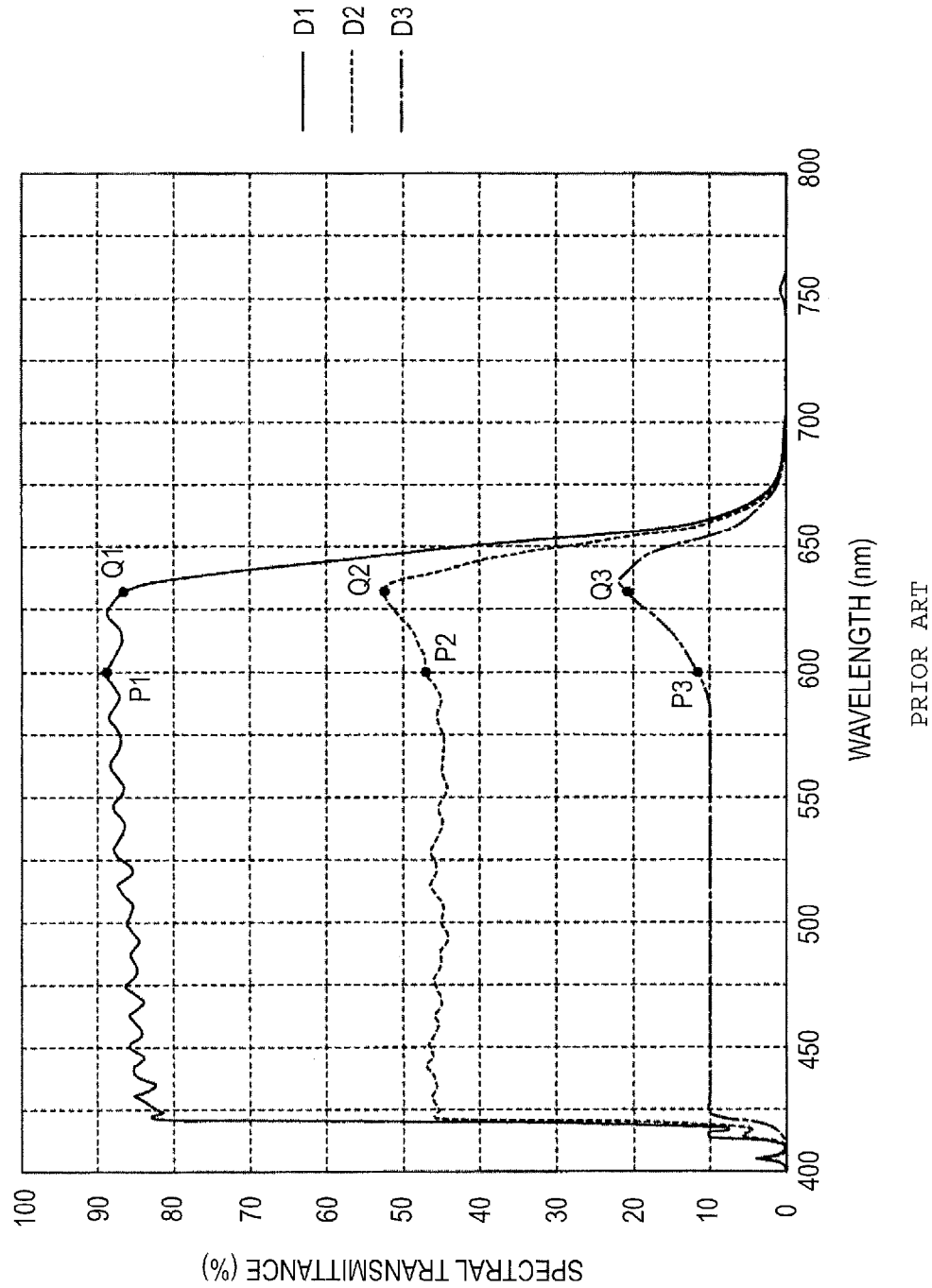
FIG. 13 is a graphical representation of the spectral transmission characteristic of the optical filter of FIG. 12 used in combination with a light control element of dichroic guest-host liquid crystal under varying densities of the light control element.

FIG. 10 is a block diagram illustrating a digital still camera as an embodiment of an imaging apparatus of the present invention.

An imaging apparatus (digital still camera) 100 includes a camera block 10 having imaging functions, a camera signal processor 20 that performs signal processing such as the analog-digital conversion of captured image signals, an image processor 30 that performs recording and reproduction of image signals, an LCD (Liquid Crystal display) 40 provided to display information such as captured images, a R/W (reader/writer) 50 that performs the write and read of image signals to and from a memory card 1000, a CPU (Central Processing Unit) 60 that controls the entire operation of the imaging apparatus 100, an input section 70 including, for example, various switches manipulated by a user to perform necessary operations, and a lens drive controller 80 that controls the driving of the lenses disposed in the camera block 10.

The camera block 10 includes, for example, an imaging optical system including a zoom lens 11, and an image sensing device 12 such as a CCD and a CMOS.

The camera signal processor 20 performs various types of signal processing, including digital conversion of output signals from the imaging device 12, noise removal, image quality compensation, and conversion into brightness and color-difference signals.

The image processor 30 performs, for example, compression coding and decompression decoding of image signals based on a predetermined image data format, and conversion of data specification such as resolution.

The LCD 40 displays information such as the state of user manipulation on the input section 70, and captured images.

The R/W 50 writes the image data encoded by the image processor 30 into the memory card 1000, and reads the recorded image data from the memory card 1000.

The CPU 60 serves as a control processor, controlling each circuit block of the imaging apparatus 100 based on, for example, input command signals from the input section 70.

The input section 70 includes, for example, a shutter release button with which a shutter is manipulated, and a select switch used to select an operation mode, and outputs input command signals to the CPU 60 in response to user manipulation.

The lens drive controller 80 controls, for example, motors that drive the lenses in the zoom lens 11, based on control signals from the CPU 60.

The memory card 1000 is, for example, a semiconductor memory detachably provided for the slot connected to the R/W 50.

The operation of the imaging apparatus 100 is described below.

During a standby mode for capturing, the captured image signals in the camera block 10 are output to the LCD 40 via the camera signal processor 20, and displayed as a camera through image, under the control of the CPU 60. Upon input of input command signals for zooming from the input section 70, the CPU 60 outputs control signals to the lens drive controller 80, and a predetermined lens in the zoom lens 11 is moved under the control of the lens drive controller 80.

When the shutter (not illustrated) of the camera block 10 is operated in response to the input command signal from the input section 70, the camera signal processor 20 outputs the captured image signals to the image processor 30 for compression coding, and the signals are converted into digital data of a predetermined data format. The converted data is output to the R/W 50, and written into the memory card 1000.

Note that focusing is performed when, for example, the shutter release button of the input section 50 is pressed halfway, or all the way for recording (capturing), upon which the lens drive controller 80 moves a predetermined lens in the zoom lens 11 for focusing based on control signals from the CPU 60.

For reproduction of the image data recorded in the memory card 1000, the R/W 50 reads predetermined image data from the memory card 1000 according to manipulation of the input section 70, and after decompression decoding by the image processor 30, reproduction image signals are output to the LCD 40 and the reproduced image is displayed.

The specific shapes and configurations of the members described in the preferred embodiments are merely exemplary in nature and have been described to simply embody the present invention. The foregoing description of the invention is thus not to be construed as being limiting the technical scope of the present invention.

The present application contains subject matter related to that disclosed in Japanese Priority Patent Application JP 2009-161471 filed in the Japan Patent Office on Jul. 8, 2009, the entire contents of which is hereby incorporated by reference.

What is claimed is:

1. An imaging optical system comprising:
a light control element formed of a dye pigment-containing dichroic guest-host liquid crystal, and that is disposed on a light path to adjust a quantity of incident light for an image sensing device; and
an optical filter disposed on the light path, and that includes an infrared absorbing material,
the optical filter having a spectral transmittance that satisfies the following conditions (1), (2), and (3)

$$0.6 < T_{IRCF(580)}/T_{IRCF(540)} < 1.05 \quad (1)$$

$$0.1 < T_{IRCF(640)}/T_{IRCF(540)} < 0.5 \quad (2)$$

$$|T_{IRCF(700)}/T_{IRCF(540)}| < 0.05 \quad (3)$$

where
$T_{IRCF(540)}$ is the spectral transmittance of the optical filter for the light with a wavelength of 540 nm,
$T_{IRCF(580)}$ is the spectral transmittance of the optical filter for the light with a wavelength of 580 nm,
$T_{IRCF(640)}$ is the spectral transmittance of the optical filter for the light with a wavelength of 640 nm, and
$T_{IRCF(700)}$ is the spectral transmittance of the optical filter for the light with a wavelength of 700 nm.

2. The imaging optical system according to claim 1, wherein a multilayered film that reflects ultraviolet rays and infrared rays is provided for the optical filter.

3. The imaging optical system according to claim 1, wherein a multilayered film that reflects ultraviolet rays and infrared rays is provided for non-optical filter optical members disposed on the light path.

4. The imaging optical system according to claim 1, wherein the light control element and the optical filter are disposed adjacent to each other between the image sensing device and a lens disposed closest to a subject on the light path.

5. The imaging optical system according to claim 1, wherein infrared absorbing glass is used for the optical filter.

6. The imaging optical system according to claim 1, wherein a cyclic olefin resin is used as the base material of the optical filter.

7. The imaging optical system according to claim 6, wherein the cyclic olefin resin contains an anthocyanin pigment or a cyanine pigment as the infrared absorbing material.

8. An imaging apparatus comprising:
an image sensing device that converts an optical image into an electrical signal;
a light control element formed of a dye pigment-containing dichroic guest-host liquid crystal, and that is disposed on a light path to adjust a quantity of incident light for the image sensing device; and
an optical filter disposed on the light path, and that includes an infrared absorbing material,
the optical filter having a spectral transmittance that satisfies the following conditions (1), (2), and (3)

$$0.6 < T_{IRCF(580)}/T_{IRCF(540)} < 1.05 \quad (1)$$

$$0.1 < T_{IRCF(640)}/T_{IRCF(540)} < 0.5 \quad (2)$$

$$|T_{IRCF(700)}/T_{IRCF(540)}| < 0.05 \quad (3)$$

where
$T_{IRCF(540)}$ is the spectral transmittance of the optical filter for the light with a wavelength of 540 nm,
$T_{IRCF(580)}$ is the spectral transmittance of the optical filter for the light with a wavelength of 580 nm,
$T_{IRCF(640)}$ is the spectral transmittance of the optical filter for the light with a wavelength of 640 nm, and
$T_{IRCF(700)}$ is the spectral transmittance of the optical filter for the light with a wavelength of 700 nm.

* * * * *